(12) United States Patent
Jang

(10) Patent No.: US 11,247,217 B2
(45) Date of Patent: Feb. 15, 2022

(54) DOUBLE-FLOW NOZZLE

(71) Applicant: Rae Sang Jang, Suwon-si (KR)

(72) Inventor: Rae Sang Jang, Suwon-si (KR)

( * ) Notice: Subject to any disclaimer, the term of this patent is extended or adjusted under 35 U.S.C. 154(b) by 90 days.

(21) Appl. No.: 16/485,913

(22) PCT Filed: Feb. 19, 2018

(86) PCT No.: PCT/KR2018/002033
§ 371 (c)(1),
(2) Date: Aug. 14, 2019

(87) PCT Pub. No.: WO2018/151570
PCT Pub. Date: Aug. 23, 2018

(65) Prior Publication Data
US 2020/0055062 A1  Feb. 20, 2020

(30) Foreign Application Priority Data
Feb. 15, 2017  (KR) .................. 10-2017-0020661

(51) Int. Cl.
*B05B 1/10* (2006.01)
*B05B 1/14* (2006.01)
*B05B 7/06* (2006.01)
*B05B 7/10* (2006.01)

(52) U.S. Cl.
CPC .................. *B05B 1/10* (2013.01); *B05B 1/14* (2013.01); *B05B 7/06* (2013.01); *B05B 7/10* (2013.01)

(58) Field of Classification Search
CPC .... B05B 1/10; B05B 1/14; B05B 7/06; B05B 7/10

USPC ................ 239/402, 403, 423, 424, 290, 294
See application file for complete search history.

(56) References Cited

U.S. PATENT DOCUMENTS

| 4,826,084 A * | 5/1989 | Wallace | B05B 7/06 239/424 |
| 5,169,070 A * | 12/1992 | Mattson | B05B 7/0081 239/290 |
| 7,575,182 B2 * | 8/2009 | Rogers, II | F26B 3/12 239/423 |
| 2016/0228896 A1 * | 8/2016 | Jones | B05B 1/005 |

FOREIGN PATENT DOCUMENTS

| JP | 2000-202326 A | 7/2000 |
| JP | 2005-288390 A | 10/2005 |
| KR | 10-0864526 B1 | 10/2008 |

(Continued)

*Primary Examiner* — Steven J Ganey
(74) *Attorney, Agent, or Firm* — Novick, Kim & Lee, PLLC; Jae Youn Kim

(57) ABSTRACT

Disclosed is a double-flow nozzle according to the present invention, the double-flow nozzle including: a body portion provided with a space portion defined at an inner side thereof; a first discharge pipe provided at the body portion and discharging a first fluid being supplied to the space portion; and a second discharge pipe discharging a second fluid while being in a state inserted into the first discharge pipe, wherein the first discharge pipe, in a state spaced apart by a predetermined gap from an outer surface of the second discharge pipe, includes a plurality of swirl-generating flow passages spaced apart by a predetermined interval from each other and arranged along a circumferential direction of the second discharge pipe.

2 Claims, 8 Drawing Sheets

(56) References Cited

FOREIGN PATENT DOCUMENTS

| KR | 10-2010-0088473 A | 8/2010 |
|---|---|---|
| KR | 20-0451031 Y1 | 11/2010 |
| KR | 10-2016-0072457 A | 6/2016 |

* cited by examiner

DOUBLE-FLOW NOZZLE

TECHNICAL FIELD

The present invention relates to a double-flow nozzle and relates to a double-flow nozzle configured to discharge different kinds of solutions or gases from each other.

BACKGROUND ART

In general, a double nozzle 10 provided with discharge ports for a solution or a gas composed of a double concentric structure as shown in FIGS. 6A-6B are structured to discharge a solution through a first discharge port 11 provided at an inner side and a gas or heterogeneous solutions through a second discharge port 12 provided at an outer side thereof.

The double nozzle 10 as described above is used to coat a granulated solution on a specific substrate or to manufacture nanostructures such as nanofibers.

However, the conventional double nozzle 10 has a limitation in preparing ultrafine particles such as nanoparticles because the area provided by the second discharge port 12 is relatively greater than an area provided by the first discharge port 11, an amount of scattering of particles due to the discharge of excessive amount of gas or solution increases, and, in the case of a low viscosity solution, it is difficult to finely control the flow rate.

For example, in manufacturing a nanofiber using a conventional double nozzle, there is a problem that a die swell phenomenon occurs when the polymer material is discharged through the first discharge port. In other words, polymer materials with high concentration and viscosity have viscoelastic properties and high surface tension, which expands the polymer material passing through narrow and long discharge pipes, thereby slowing down the discharge rate, and increasing the diameter of the nano-silk composing the nanofibers.

In addition, when high voltage applied to the polymer material does not overcome the surface tension of the polymer material due to drag force generated in the polymer material, there is a problem such that the polymer material is discharged in a form of droplets, thereby forming a non-uniform nanofiber web.

In order to solve the above problems, when the polymer material is discharged from the first discharge port, a physical method that may lower the surface tension of the polymer material by discharging compressed air from the second discharge port is used. Nevertheless, with the structure of the existing double nozzle, it is still not possible to prevent the phenomenon that the polymer material or the solution discharged from the first discharge port is scattered. Therefore, the conventional double nozzle has a limitation in that the polymer material or the solution cannot be accurately discharged in the predetermined discharge area.

Accordingly, the present applicant has proposed the present invention to solve the above problems, and there is a related art document entitled as "A manufacturing device and the method of preparing for the nanofibers" of Korean Patent No. 10-0864526.

DISCLOSURE

Technical Problem

Accordingly, the present invention has been made in view of the above problems, and an object of the present invention is to provide a double-flow nozzle configured to respectively discharge solutions different from each other or a solution and a gas and to maintain straightness of the solution in the discharging process thereof.

Technical Solution

In order to accomplish the above object, the present invention provides a double-flow nozzle, including: a body portion provided with a space portion defined at an inner side thereof; a first discharge pipe provided at the body portion and discharging a first fluid being supplied to the space portion; and a second discharge pipe discharging a second fluid while being in a state inserted into the first discharge pipe, wherein the first discharge pipe, in a state spaced apart by a predetermined gap from an outer surface of the second discharge pipe, may include a plurality of swirl-generating flow passages spaced apart by a predetermined interval from each other and arranged along a circumferential direction of the second discharge pipe.

In addition, the first fluid discharged from the swirl-generating flow passages may induce straightness or increase flow velocity of the second fluid discharged from the second discharge pipe.

In addition, the first discharge pipe may include a first flow passage communicatively connected to the space portion and having an inner diameter decreasing gradually toward a discharge direction of the first fluid, and a second flow passage communicatively connected to the first flow passage and having an inner diameter of a constant size.

In addition, in a state of having an oval or arcuate cross section in which one side portion facing a circumferential surface of the second discharge pipe is opened, the swirl-generating flow passages may be provided on an inner surface of the first discharge pipe.

In addition, the swirl-generating flow passages may be provided along a part of the inner surface of the first discharge pipe in a longitudinal direction, the inner surface partitioning the first flow passage and may be provided along an entire inner surface of the first discharge pipe in the longitudinal direction, the entire inner surface partitioning the second flow passage.

In addition, the plurality of the swirl-generating flow passages may be provided spirally along the longitudinal direction of the first discharge pipe on the inner surface of the first discharge pipe.

In addition, the second discharge pipe may be protruded by a predetermined interval from an end of the first discharge pipe, thereby being exposed to an outside of the first discharge pipe.

In addition, planar areas of the plurality of the swirl-generating flow passages may be smaller than a discharge port area of the second discharge pipe.

Advantageous Effects

As described above, a double-flow nozzle according to an embodiment of the present invention can be used interchangeably in the industrial field for producing products by respectively discharging heterogeneous solutions or in the industrial field for producing products by respectively discharging a solution or a gas.

In addition, the double-flow nozzle according to the embodiment of the present invention allows a second fluid discharged from the second discharge pipe to be discharged while maintaining the straightness by preventing from being scattered by a first fluid discharged from swirl-generating flow passages.

In addition, the double-flow nozzle according to the embodiment of the present invention allows flow velocity of the first fluid discharged from the first discharge pipe to be increased by a plurality of swirl-generating flow passages provided spirally.

In addition, the double-flow nozzle according to the embodiment of the present invention can be applied to manufacture nanofibers, thereby reducing a generation rate of droplets generated in a nanofiber web.

MODE FOR INVENTION

Advantages and features of the present invention and methods of achieving the same will become apparent with reference to the embodiments described below in detail in conjunction with the accompanying drawings.

However, the present invention is not limited to the embodiments disclosed below and may be implemented in various different forms. The present embodiments are provided only to make the disclosure of the present invention complete, and to fully inform the scope of the invention to those having common knowledge in the art to which the present invention pertains. That is, the present invention is defined only by the scope of the claims.

Hereinafter, a double-flow nozzle according to the embodiments of the present invention will be described in detail with reference to FIGS. 1 to 5. In describing the present invention, specific descriptions of related well-known functions or configurations are omitted in order not to obfuscate the subject matter of the present invention.

Figure 1:
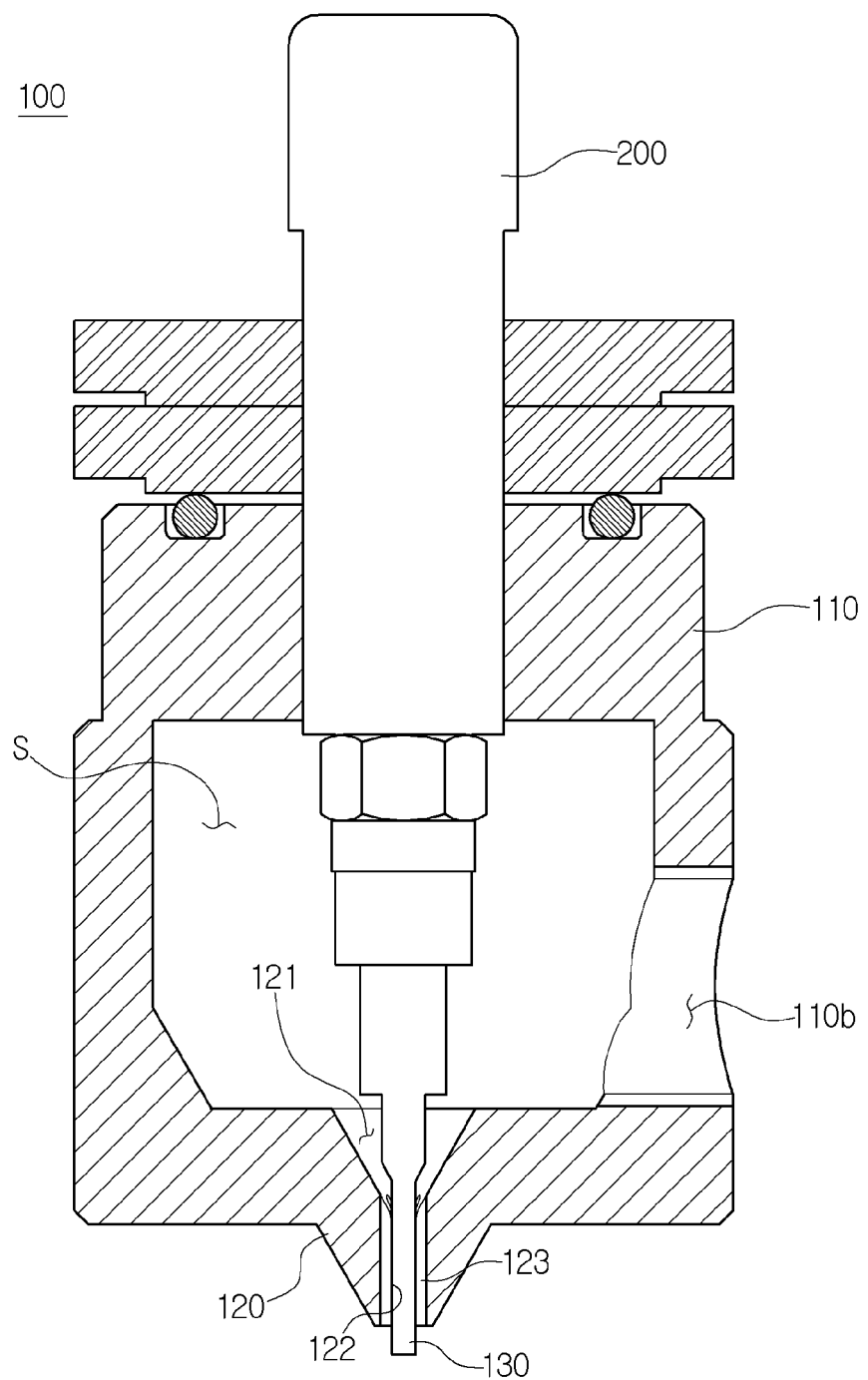
FIG. 1 is a sectional view of a double-flow nozzle according to an embodiment of the present invention.
Figure 2:
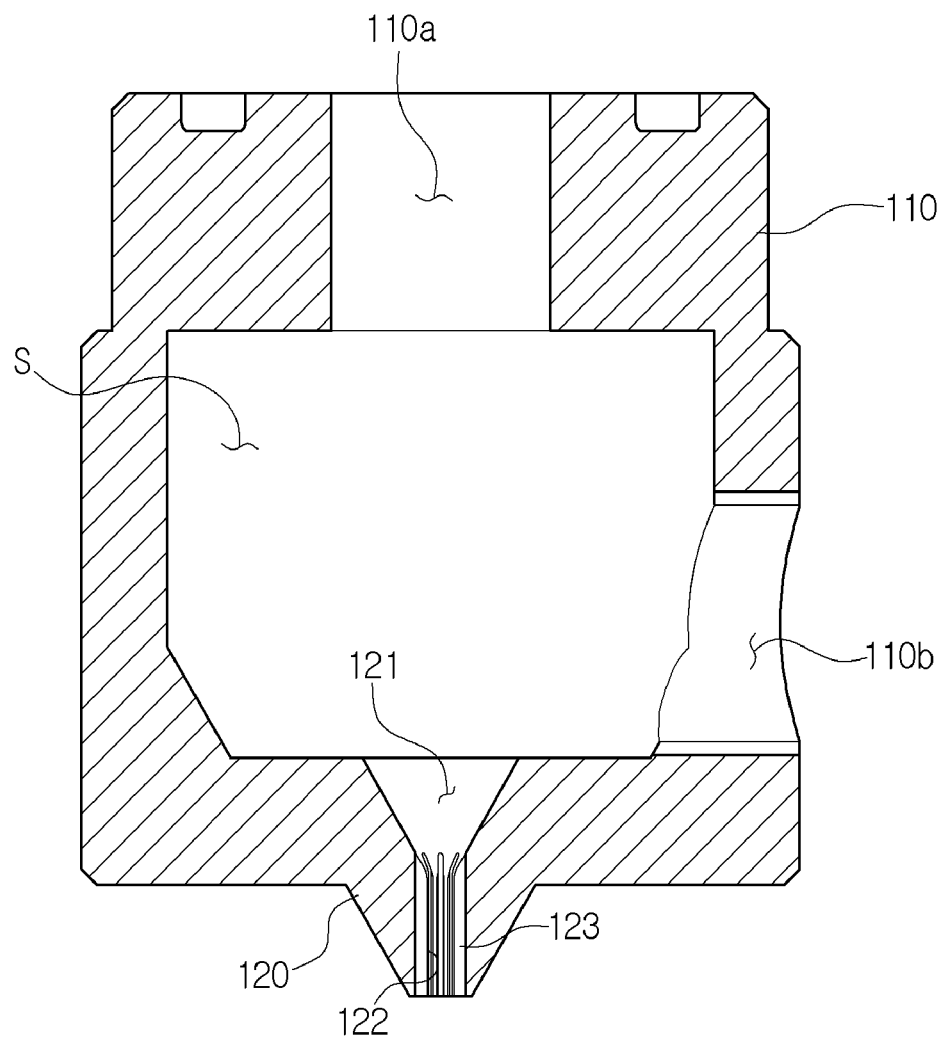
FIG. 2 is a sectional view of a body portion and a first discharge pipe shown in FIG. 1.
Figure 3:
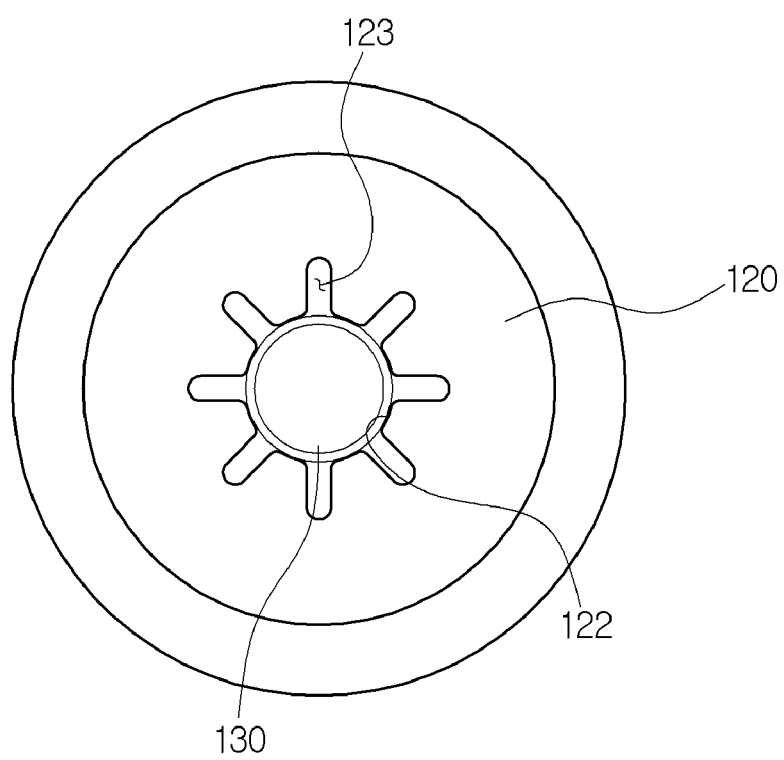
FIG. 3 is a bottom view of the first discharge pipe shown in FIG. 1.
Figure 4:
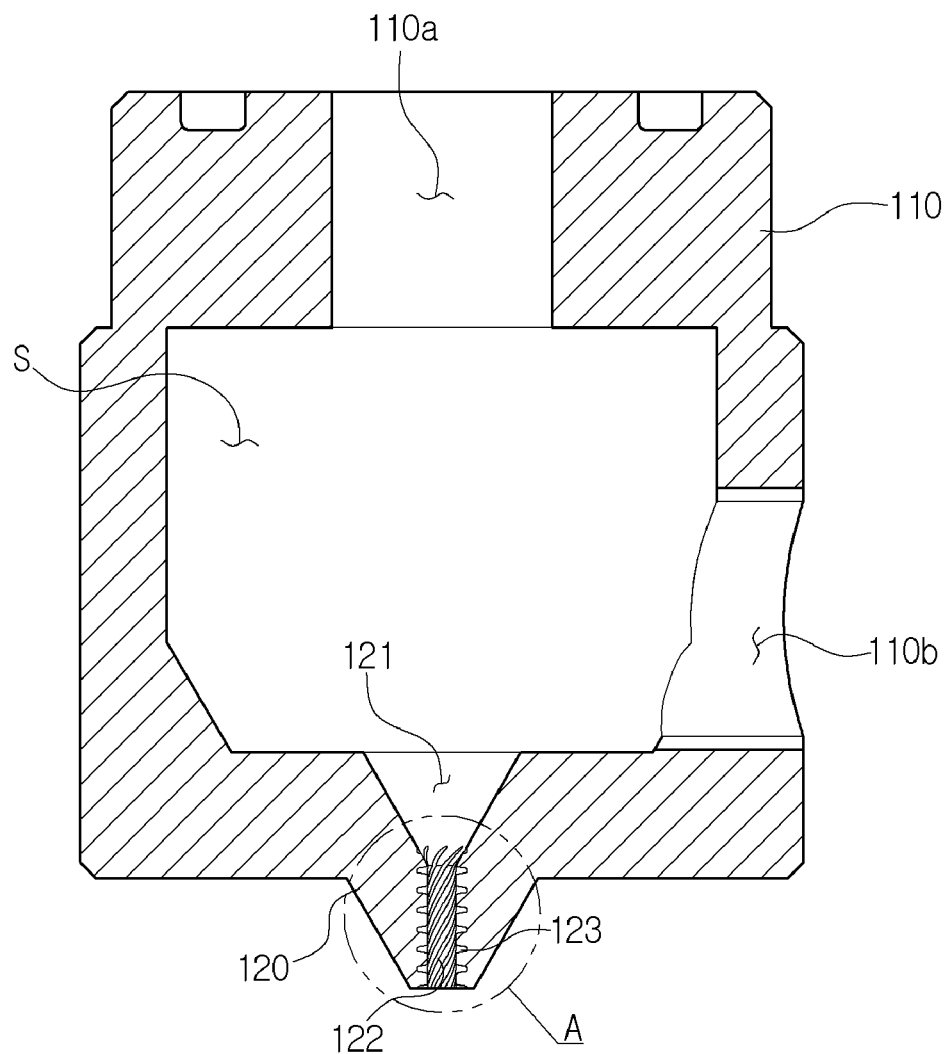
FIG. 4 is a sectional view showing a swirl-generating flow passages provided spirally on an inner surface of the first discharge pipe according to the embodiment of the present invention.
Figure 5:
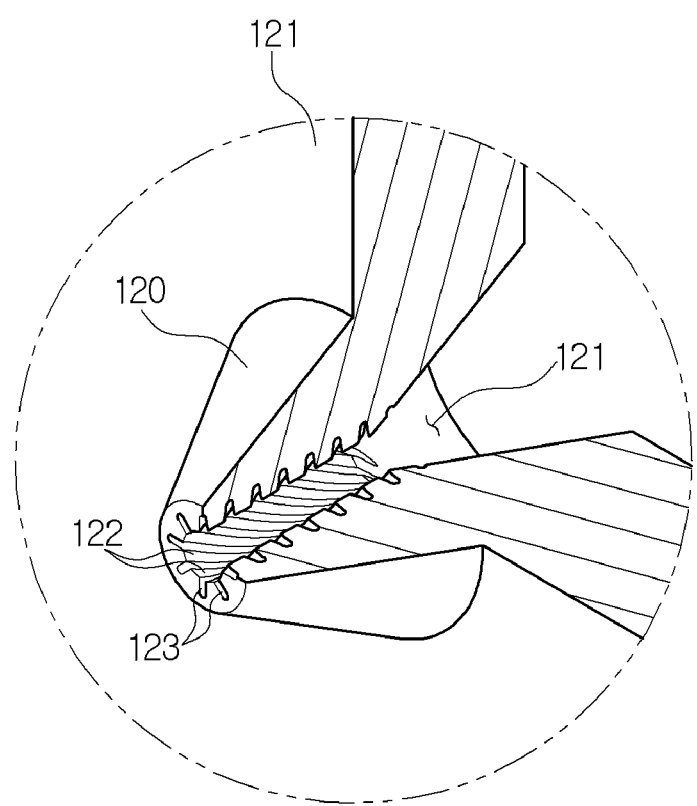
FIG. 5 is a sectional perspective view of a portion A shown in FIG. 4.

FIG. 1 is a sectional view of the double-flow nozzle according to the embodiment of the present invention, FIG. 2 is a sectional view of a body portion and a first discharge pipe shown in FIG. 1, FIG. 3 is a bottom view of the first discharge pipe shown in FIG. 1, FIG. 4 is a sectional view showing a swirl-generating flow passages provided spirally on an inner surface of the first discharge pipe according to the embodiment of the present invention, and FIG. 5 is a sectional perspective view of a portion A shown in FIG. 4.

As shown in FIGS. 1 to 3, the double-flow nozzle 100 according to the embodiment of the present invention may include a body portion 110 provided with a space portion S defined at an inner side thereof, a first discharge pipe 120 provided at the body portion 110 and discharging a fluid being supplied to the space portion S, and a second discharge pipe 130 discharging a second fluid while being in a state inserted into the first discharge pipe 120.

A first hole 110a through which a discharge unit 200 connected to the second discharge pipe 130 may be inserted may be provided at an upper portion of the body portion 110.

Therefore, the discharge unit 200 may be disposed in the space S defined at the inner side of the body portion 110 through the first hole 110a. For reference, the discharge unit 200 may be connected to a second fluid supply unit (not shown) so that a second fluid may be transferred thereto.

In addition, a second hole 110b may be provided at one side of the body portion 110. The second hole 110b may be connected to a supply pipe or supply tube, which is not shown, of a first fluid supply unit (not shown). Therefore, a first fluid may be supplied to the space S defined at the inner side of the body portion 110 through the second hole 110b.

As described above, the first fluid introduced into the space S through the second hole 110b may be discharged to a discharge area disposed outside the body portion 110 by the first discharge pipe 120.

The first discharge pipe 120, provided in the lower portion of the body portion 110, may include a first flow passage 121, communicatively connected to the space portion S and having an inner diameter decreasing gradually toward a discharge direction of the first fluid; and a second flow passage 122, communicatively connected to the first flow passage 121 and having an inner diameter of a constant size.

The first flow passage 121 of the first discharge pipe 120 plays a role in guiding the first fluid introduced into the space portion S to a direction where the second flow passage 122 is provided and also plays a role in increasing flow velocity of the first fluid. That is, the inner surface of the first discharge pipe 120 partitioning the first passage 121 may be provided to be inclined downward toward the direction where the second passage 122 is provided. Accordingly, the first fluid introduced into the space portion S may flow toward the second flow passage 122 in a state where the flow velocity is increased from an inner surface portion of the first discharge pipe 120 partitioning the first flow passage 121.

The second flow path 122 may receive the first fluid transferred passing through the first flow path 121 to discharge the first fluid to a discharge area (not shown) and have an inner diameter greater than an outer diameter of the second discharge pipe 130, so that the second discharge pipe 130 may be inserted thereinto.

Meanwhile, the first discharge pipe 120, in a state spaced apart by a predetermined gap from an outer surface of the second discharge pipe 130, may include a plurality of swirl-generating flow passages 123 spaced apart by a predetermined interval from each other and arranged along a circumferential direction of the second discharge pipe 130.

The swirl-generating flow passages 123 may have an oval or arcuate cross section in which one side portion facing a circumferential surface of the second discharge pipe 130 is opened as shown in FIG. 3.

The swirl-generating flow passages 123, having the oval or arcuate cross section in which one side portion is opened as described above, may be provided along a part of the inner surface of the first discharge pipe in a longitudinal direction, wherein the inner surface partitions the first flow passage and may be provided along an entire inner surface of the first discharge pipe in the longitudinal direction, wherein the entire inner surface partitions the second flow passage, as shown in FIG. 2.

The swirl-generating flow passages 123 configured as above may induce straightness of the second fluid discharged from the second discharge pipe 130 or increase the flow velocity of the second fluid.

For example, when the double-flow nozzle 100 configured as above is used to manufacture nanofibers, a spinning solution (second fluid) in which polymer material and a solvent are mixed is discharged from the second discharge pipe 130 and a process gas (first fluid) lowering surface tension of the spinning solution may be discharged from the first discharge pipe 120.

Here, the process gas discharged from the first discharge pipe 120 may be discharged to the lower circumferential surface side of the second discharge pipe 130 via the first flow passage 121 and the plurality of swirl-generating flow passages 123 sequentially. The process gas discharged to the lower circumferential surface side of the second discharge pipe 130 as described above may allow a jet stream to be formed around the discharge port of the second discharge pipe 130 in the process of discharging the spinning solution from the second discharge pipe 130.

Accordingly, the spinning solution may be discharged to the discharge area in a state of maintaining the straightness without being scattered to the outside by the jet stream formed around the discharge port of the second discharge pipe 130, and thus nanofibers formed of nano-silk of uniform diameter may be collected in the nanofiber collecting portion, which is not shown.

In addition, the flow velocity of the process gas discharged from the first discharge pipe 120 has a close relationship with the quality of the nanofibers collected in the nanofiber collecting portion. That is, the faster the velocity of the process gas formed on the lower circumferential surface of the second discharge pipe 130, the lower the generation rate of droplets formed in the nanofibers.

Therefore, in terms of accelerating the process gas, as shown in FIGS. 4 and 5, the swirl-generating flow passages 123 may be provided spirally along the longitudinal direction of the first discharge pipe 120 on the inner surface of the first discharge pipe 120.

As described above, the plurality of swirl-generating flow passages 123 provided spirally along the longitudinal direction of the first discharge pipe 120 may allow the process gas introduced into the first flow passage 121 of the first discharge pipe 120 to be in turbulence, thereby increasing the flow velocity.

Therefore, the process gas discharged from the first discharge pipe 120 may be discharged with the flow velocity accelerated by the plurality of swirl-generating flow passages 123 formed spirally, accordingly, the jet stream may be more easily formed around the lower end of the second discharge pipe 130, and the generation rate of droplets generated in the nanofibers may be reduced.

In addition, as being discharged in a state surrounding the periphery of the solution discharged from the second discharge pipe 130, the process gas of which the flow velocity is increased by the swirl-generating flow passages 123 allows the solution discharged from the second discharge pipe 130 not to be scattered, thereby guiding the solution to maintain the straightness while being discharged to the discharge area.

In addition, because the flow velocity of the solution discharged from the second discharge pipe 130 may be increased by the process gas discharged from the spinning flow path 123, there is no need to increase a pressure of the discharge unit 200 separately. Accordingly, because the desired discharge flow velocity of the solution may be obtained even by using the discharge unit 200 having a low specification, eventually, the process cost and the processing time of the nanofibers or other products formed by the double nozzle may be reduced.

For reference, it has been described above that the process gas is discharged from the first discharge pipe 120 and the spinning solution is discharged from the second discharge pipe 130 to manufacture nanofibers, but is not limited thereto. Naturally, different kinds of solutions may be discharged from the first discharge pipe 120 and the second discharge pipe 130, respectively.

As being provided at a lower end of the discharge unit 200 which is inserted into and mounted in the first hole 110a of the body portion 110, as described above, the second discharge pipe 130 may be inserted into the first discharge pipe 120.

Here, when the first fluid discharged from the first discharge pipe 120 is a gas and the second fluid discharged from the second discharge pipe 130 is a solution, as shown in FIG. 1, the second discharge pipe may be protruded by about 0.5 mm-1 mm from the end of the first discharge pipe 120, thereby being exposed to an outside of the first discharge pipe.

In addition, as shown in FIG. 3, planar areas of the plurality of swirl-generating flow passages 123 are preferably smaller than a discharge port area of the second discharge pipe 130. That is, it may be said that the flow rate of the second fluid discharged from the second discharge pipe 130 is greater than the flow rate of the first fluid discharged from the plurality of swirl-generating flow passages 123.

As described above, the reason why the planar areas of the plurality of swirl-generating flow passages 123 are formed to be smaller than the discharge port area of the second discharge pipe 130 is to allow interference of the solution discharged from the second discharge pipe 130 with the solution discharged from the pipe 120 to be minimized, thereby inducing the straightness of the solution discharged from the second discharge pipe 130. When the planar areas provided by the plurality of swirl-generating flow passages 123 is relatively greater than the planar area of the discharge port of the second discharge pipe 130, an excessive amount of the solution or gas may be discharged, whereby a problem mentioned in the section of "Background Art" above may be generated.

Figure 7:
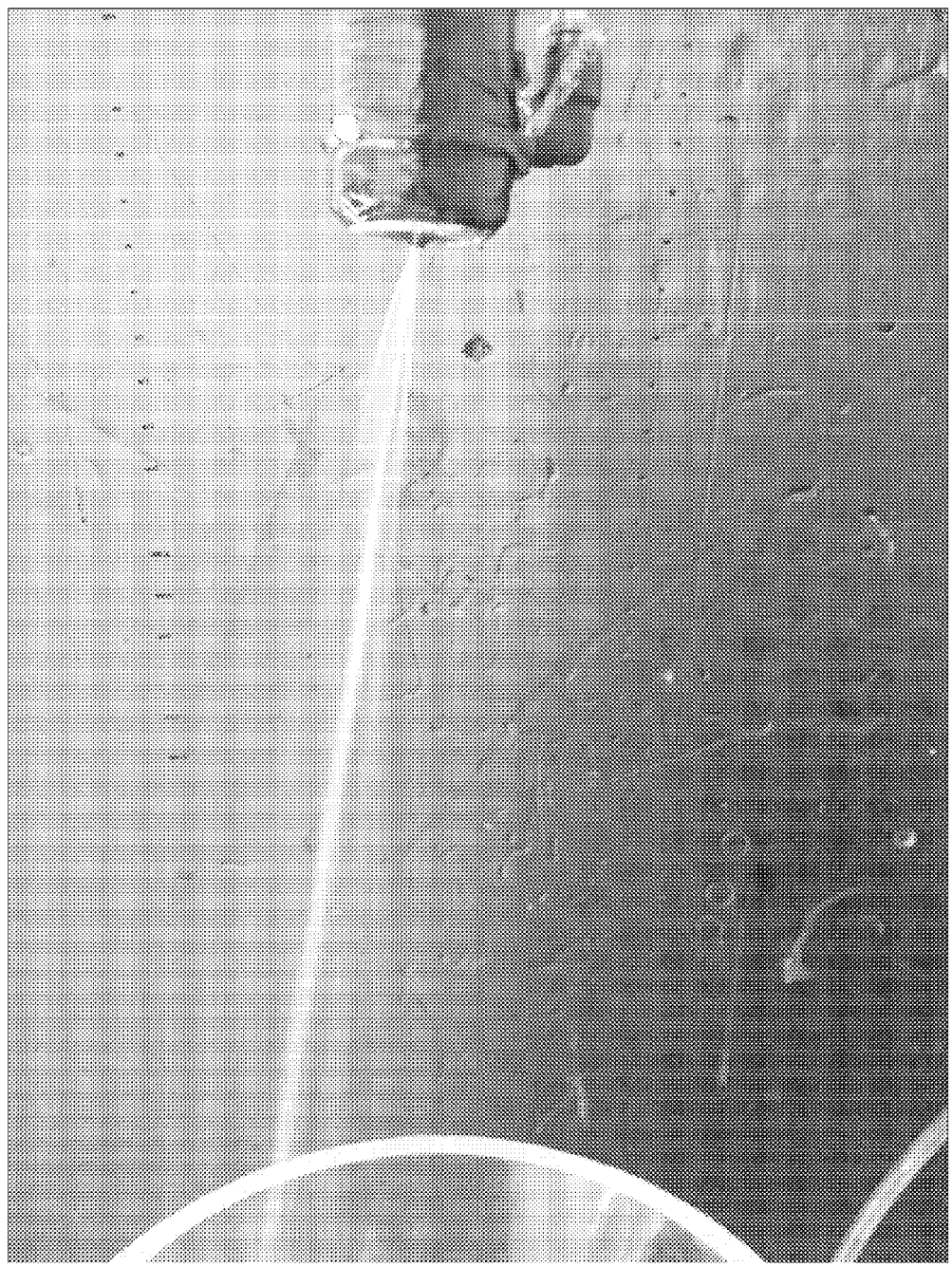
FIG. 7 is a state in which a liquid is discharged from a conventional double nozzle.

For reference, FIG. 7 shows a state in which a liquid is discharged from a conventional double nozzle. As shown in FIG. 7, at the first discharge port 11 and the second discharge port 12 constituting the conventional double nozzle, the liquid discharged from the first discharge port 11 is discharged being bent by the pressure of the liquid discharged from the second discharge port 12, as is shown. That is, the liquids discharged from the ends of the first discharge port 11 and the second discharge port 12, respectively, interfere with each other, thereby generating a problem of being unable to maintain straightness and being discharged in a bent shape. As a result, the conventional double nozzle has a drawback in that the solution discharged from the second discharge port 12 is unable to maintain the straightness and discharged in a widely spread state, thereby being discharged to an area other than the preset discharge area.

Figure 8:
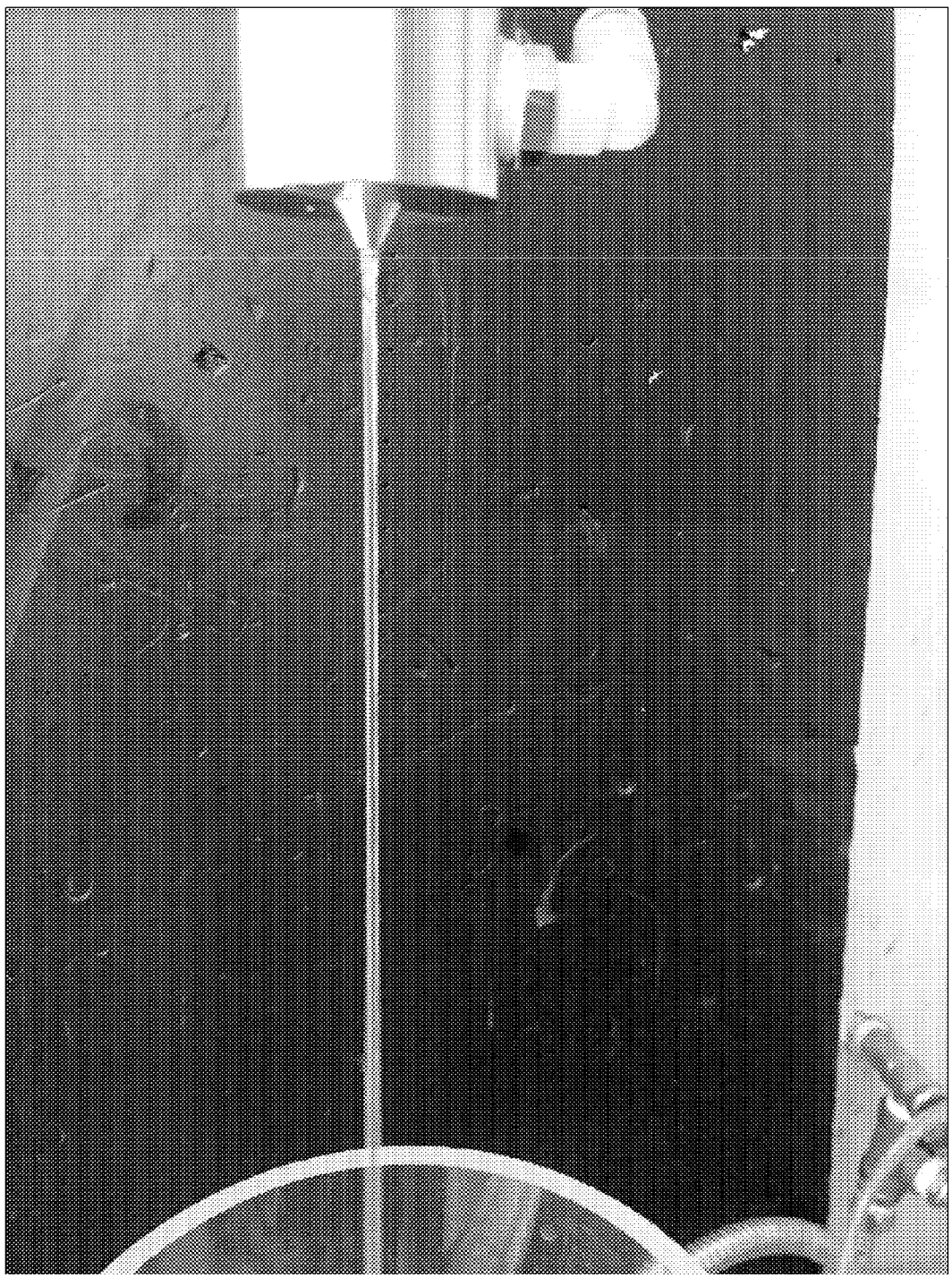
FIG. 8 is a state in which the solution is discharged in the double-flow nozzle according to the embodiment of the present invention.

On the other hand, in FIG. 8, a state in which the solution is discharged in the double-flow nozzle according to the embodiment of the present invention is shown.

Figure 6A:
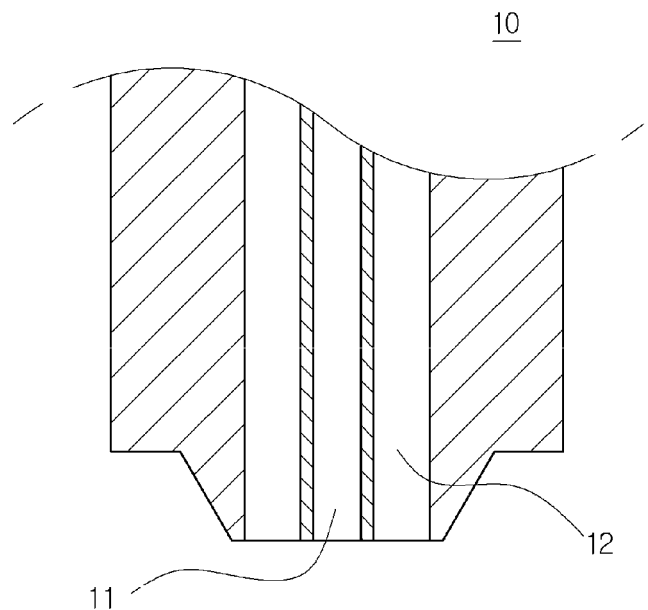
FIG. 6A is a sectional view of a conventional double nozzle.
Figure 6B:
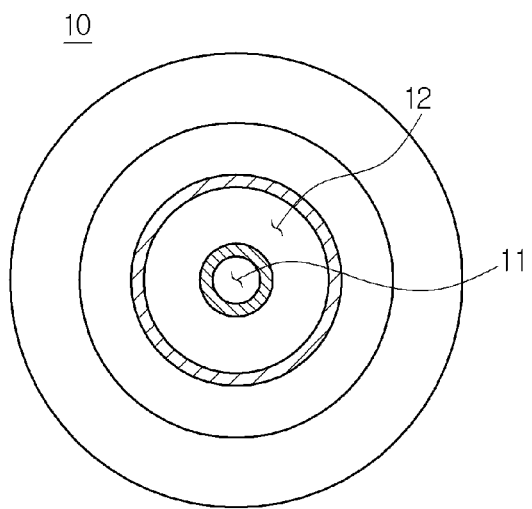
FIG. 6B is a bottom view of the conventional double nozzle.

As shown in FIG. 1, in the double-flow nozzle 100 according to the embodiment of the present invention, the end of the second discharge pipe 130 is protruded relatively further from the end of the first discharge pipe 120, whereby the liquid discharged from the first discharge pipe 120 may be prevented from being interfered with the liquid discharged from the second discharge pipe 130. As a result, the liquid discharged from the first discharge pipe 120 may be discharged in a state of maintaining the straightness. In addition, the plurality of swirl-generating flow passages 123 according to the embodiment of the present invention may be provided in the first discharge pipe 120 in a state of having an area smaller than the area of the first discharge port 11 (refer to FIGS. 6A-6B) provided in the existing double nozzle. Further, the plurality of swirl-generating flow passages 123 may be provided in the first discharge pipe 120 in a state of having an area smaller than the area of the discharge port provided in the first discharge pipe 120. As a result, the solution discharged from the second discharge pipe 130 has an advantage of being discharged in a state of maintaining the straightness as compared to the solution discharged from the conventional double nozzle 10.

While specific embodiments according to the present invention have been described so far, various modifications are possible without departing from the scope of the present invention.

Therefore, the scope of the present invention should not be limited to the described embodiments, but should be defined not only by the claims below, but also by the equivalents of the claims.

INDUSTRIAL APPLICABILITY

The double-flow nozzle of the present invention can be applied to industrial apparatuses such as machinery apparatuses, textile manufacturing apparatuses, and new material manufacturing apparatuses for spraying different kinds of liquids or gases and thus can be sold and used.

The invention claimed is:

1. A double-flow nozzle, comprising:
a body portion provided with a space portion defined at an inner side thereof;
a first discharge pipe provided at the body portion and discharging a first fluid being supplied to the space portion; and
a second discharge pipe discharging a second fluid while being in a state inserted into the first discharge pipe and having an outer diameter of a constant size,
wherein the first discharge pipe, in a state spaced apart by a predetermined gap from an outer surface of the second discharge pipe, includes a plurality of swirl-generating flow passages spaced apart by a predetermined interval from each other and arranged along a circumferential direction of the second discharge pipe,
wherein the plurality of the swirl-generating flow passages are provided spirally along a longitudinal direction of the first discharge pipe on an inner surface of the first discharge pipe, allowing the first fluid discharged through the swirl-generating flow passages to be discharged by rotation,
wherein the first discharge pipe includes a first flow passage communicatively connected to the space portion and having an inner diameter decreasing gradually toward a discharge direction of the first fluid, and a second flow passage coming into contact with an outer surface of the second discharge pipe in a state communicatively connected to the first flow passage and having an inner diameter of a constant size,
wherein the swirl-generating flow passages are provided along a part of the inner surface of the first discharge pipe in the longitudinal direction, the inner surface partitioning the first flow passage, and along an entire inner surface of the first discharge pipe in the longitudinal direction, the entire inner surface partitioning the second flow passage, in a state of having an oval or arcuate cross section in which one side portion facing a circumferential surface of the second discharge pipe is opened, allowing the swirl-generating flow passages to be communicatively connected to the circumferential surface of the second discharge pipe,
wherein the second discharge pipe is protruded by a predetermined interval from an end of the first discharge pipe toward a discharge direction of the second fluid, thereby being exposed to an outside of the first discharge pipe, to allow interference of the liquid discharged from the first discharge pipe with the second fluid discharged from the second discharge pipe upon start of the discharge, and
wherein the first fluid supplied to the space portion is discharged in a space partitioning the plurality of swirl-generating flow passages and the outer surface of the second discharge pipe by each other, inducing straightness or increasing flow velocity of the second fluid discharged from the second discharge pipe.

2. The double-flow nozzle of claim 1, wherein planar areas of the plurality of the swirl-generating flow passages are smaller than a discharge port area of the second discharge pipe.

* * * * *